V. E. RUSCO.
Slaughtering Elevator.

No. 85,134.

Patented Dec. 22, 1868.

Witnesses,
W. E. Marrs
J. L. Coburn

Inventor;
Volney E Rusco

VOLNEY E. RUSCO, OF CHICAGO, ILLINOIS.

Letters Patent No. 85,134, dated December 22, 1868.

IMPROVEMENT IN GAMBRELS AND THEIR SUPPORTS FOR SLAUGHTERING-PURPOSES.

The Schedule referred to in these Letters Patent and making part of the same.

*To all whom it may concern:*

Be it known that I, VOLNEY E. RUSCO, of Chicago, in the county of Cook, and State of Illinois, have invented a new and useful Improvement in Gambrels and their Supports; and I do hereby declare and make known that the following is a full, clear, and exact description of the same, reference being had to the accompanying drawings, and the letters and figures marked thereon, which form part of this specification.

My said invention consists in so constructing gambrels and their supports, for use in slaughter-houses, that said gambrels may be supported upon their ways without danger of slipping off and falling, by reason of the slipping of one end in such manner as to cause the gambrel to assume a diagonal position upon its supports, and so that the friction of said gambrels upon their supports, when being moved along upon the same, may be materially decreased.

To enable those skilled in the art to understand how to construct and use my said invention, I will proceed to describe the same with particularity, making reference in so doing to the aforesaid drawings, in which—

Figure 1:
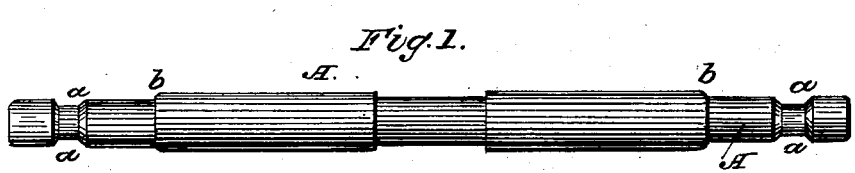
Figure 2:
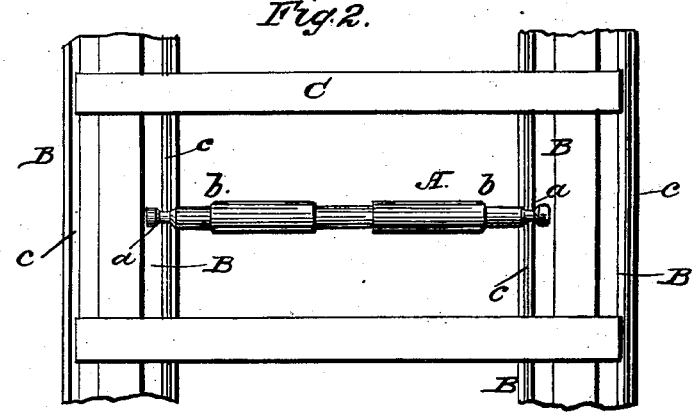

Figure 1 represents a detached view of the gambrel;

Figure 2, a top view of the same upon its ways or supports; and

Figure 3:
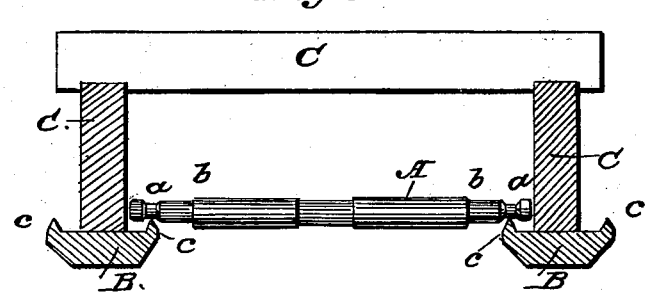

Figure 3, an end view of said ways, supporting the gambrel.

Similar letters of reference in the several figures denote the same parts of my invention.

A represents a round gambrel, which is used to spread and suspend dressed animals, in order that the flesh may become cool, the ends thereof being inserted beneath the tendons at the gambrel-joint of the hind legs, and projecting outwards, the spread being effected by means of the shoulders $b$ $b$ upon the gambrel, which prevent the sides of the hog or other animal from coming together.

The outer ends of these gambrels, when raised up, are supported upon horizontal ways or bars marked B, and are usually constructed with smooth, uniform ends, and rest upon flat ways or supports B.

My invention consists in forming upon the ends of the gambrels, whether round or flat in form, certain grooves or channels, marked $a$ $a$ in the drawings, and in forming upon the ways B certain edge-like ribs, $c$ $c$, at such a distance apart that the grooves $a$ $a$ upon the gambrels fit upon the ribs or guides $c$ $c$ upon the supporting-ways, as indicated in the drawings.

It will readily be seen that the effect of the grooves $a$ and the rib-guides $c$ operating together is to prevent either end of the gambrel from slipping off from its support, by reason of the sliding of one end of the gambrel upon its support, so as to cause the same to lie diagonally or obliquely across said supports, thus securely keeping the gambrel upon its ways, as desired, and preventing the animal from falling when suspended.

Another advantage of having the gambrel rest upon the ribs or edges $c$, instead of upon a flat, level surface, is the great decrease of friction between the gambrel and its supports, thus rendering it much easier to slide the gambrel along upon its ways, in adjusting the suspended animals at the proper distance apart, while at the same time there is, by reason of the grooves $a$ $a$, no danger that the gambrel will slide off and let the animal fall.

Having described the construction and operation of my invention, I will specify what I claim, and desire to secure by Letters Patent.

I claim the gambrel A and the supporting-ways B, when constructed and operating substantially as herein set forth and shown.

VOLNEY E. RUSCO.

Witnesses:
W. E. MARRS,
J. L. COBURN.